United States Patent [19]

Stanley

[11] Patent Number: 5,759,644
[45] Date of Patent: Jun. 2, 1998

[54] DECORATIVE COMPUTER MONITOR COVER

[76] Inventor: David B. Stanley, 4576 Plum Orchard La., Stone Mountain, Ga. 30083

[21] Appl. No.: 270,368

[22] Filed: Jul. 5, 1994

[51] Int. Cl.[6] .................................................. B65D 65/02
[52] U.S. Cl. ........................ 428/14; 150/165; 206/320; 428/100
[58] Field of Search ................. 428/14, 100; 150/165; 206/320

[56] References Cited

U.S. PATENT DOCUMENTS

| | | | |
|---|---|---|---|
| D. 323,929 | 2/1992 | Hodson | D14/114 |
| D. 338,884 | 8/1993 | Toedter | D14/115 |
| 1,315,794 | 9/1919 | Richards | 150/154 X |
| 2,467,471 | 4/1949 | Goldstein | 150/165 |
| 4,736,418 | 4/1988 | Steadman | 379/451 |
| 4,759,194 | 7/1988 | Shapiro | 62/262 |
| 4,782,873 | 11/1988 | Messner et al. | 150/154 |
| 4,932,524 | 6/1990 | Hodson | 206/320 |
| 4,997,229 | 3/1991 | Swanson | 150/166 X |
| 5,155,627 | 10/1992 | Keehn et al. | 359/609 |
| 5,163,870 | 11/1992 | Cooper | 424/184 |

OTHER PUBLICATIONS

"Anti-static vinyl dust cover", p. 57, Global Computer Supplies, Jul. 1994.
"Contour glare filter", p. 78, Global Computer Supplies, Jul. 1994.
"Monitor dust cover", p. 138, MacWarehouse, 1993.
"Monitor dust cover", p. 69, UARCO, 1994.

*Primary Examiner*—Henry F. Epstein
*Attorney, Agent, or Firm*—Barry E. Kaplan

[57] ABSTRACT

A decorative cover for computer monitors having a covering material assembly (10), made of a flexible covering material (12) configured to conform to the general size and shape of the forward portion of a computer monitor (20). The cover has an opening through which the computer monitor screen may be directly viewed while the cover is in place on the monitor. The cover opening is maintained by a preformed support member (14), made of a semi-rigid material, which is attached to the covering material. The cover is held in place on the monitor by securing means comprised of elastic banding (16) and/or hook and loop fastening strips (18).

10 Claims, 6 Drawing Sheets

DECORATIVE COMPUTER MONITOR COVER

RELATED APPLICATIONS

This invention is related to my patent titled "Decorative Computer Keyboard Cover," Ser. No. 08/271,000 filed on Jul. 5, 1994, which issued as U.S. Pat. No. 5,551,497.

BACKGROUND

1. Field of Invention

This invention relates to computer equipment covers, specifically to such covers which are used to cover computer monitors.

2. Description of Prior Art

Personal computers are standard items of equipment for the modern home and office. Millions of people own personal computers. However, if all these personal computers were lined up side by side they would all basically look the same. For a computer to be truly personal it needs personalizing. It needs a decorative element which can distinguish one person's computer from another's. A way to personalize a computer is by means of a decorative computer monitor cover.

Computer covers of the prior art, specifically those that cover computer monitors, are primarily protective shields that keep dust and spills from coming into contact with the monitor parts and circuitry. Although not necessarily decorative in design, some covers of the prior art are constructed of colored fabrics. Others, for example U.S. Pat. No. 5,163,870 to Cooper, are made of very undecorative plastic sheet material through which the monitor may be viewed indirectly. Covers of this type are used by loosely draping the cover over the monitor and must be removed in order to directly view the monitor screen.

Another type of monitor cover recently provided by the prior art offers no protection but is, however, decorative. Being a picture laminated to a flat piece of cardboard having a hole cut out through which to view the monitor screen, these "screen frames" hang on the front of the monitor. Covers of this type serve to hide the monitor rather than make use of the monitor's form.

At present none of these covers have been specifically designed to be decorative, to conform to the general size and shape of the forward portion of a computer monitor, to have the capability to remain in place on the monitor while the monitor is in use meanwhile allowing the monitor screen to be viewed directly, to be easily removable, and to provide a degree of protection to the monitor.

SUMMARY OF THE INVENTION

Accordingly, several objects and advantages of the present invention are:

(a) to provide a decorative cover which allows a person to decorate and personalize his or her computer monitor;

(b) to provide a decorative cover which may be constructed of various fabrics and other covering materials;

(c) to provide a decorative cover which may be of various colors, textures, and patterns either singularly or simultaneously;

(d) to provide a decorative cover to which decorative features may be attached or applied;

(e) to provide a decorative cover which conforms to the general size and shape of the forward portion of a computer monitor;

(f) to provide a decorative cover which has an opening through which the monitor screen is directly viewed while the cover remains in place on the monitor;

(g) to provide a decorative cover which has a support member which shapes the cover and holds it down and over the front of the monitor;

(h) to provide a decorative cover which has securing means which hold the cover in place on the monitor;

(i) to provide a decorative cover which is easily removable; and (j) to provide a decorative cover which provides a degree of protection to the monitor.

Still further objects and advantages of the present invention will become apparent to those skilled in the art from a consideration of the following description and drawings.

REFERENCE NUMERALS

Figure 1:
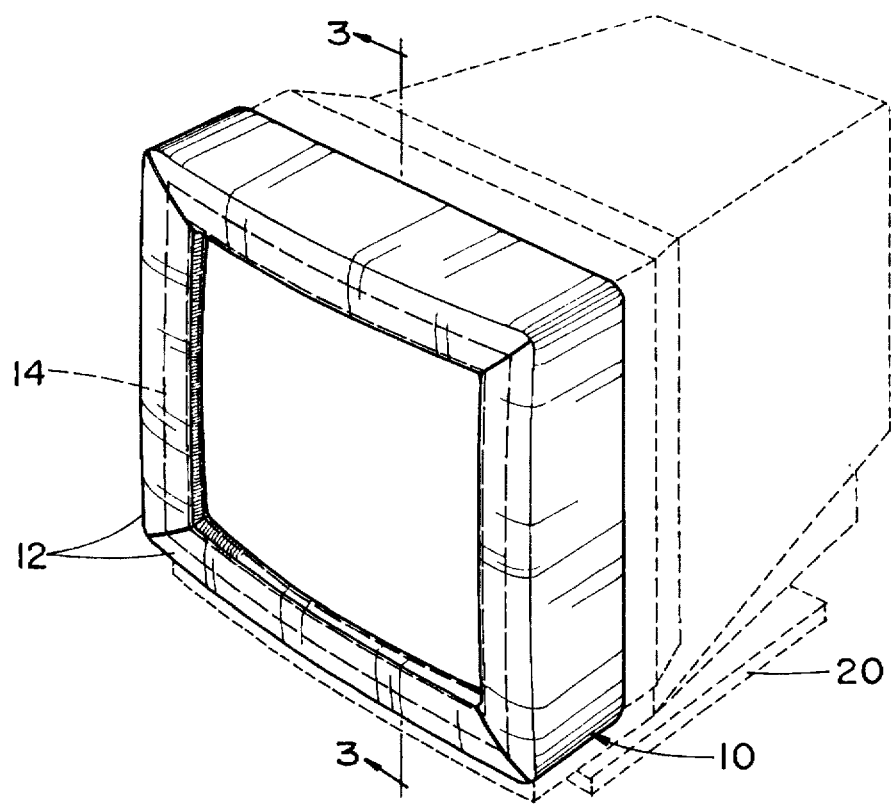
FIG. 1 shows a front perspective view of the present invention shown in place on a computer monitor.

10. Covering material assembly
12. Covering material
14. Preformed support member
16. Elastic banding
18. Hook and loop fastening strips
20. Monitor
22. Decorative feature
24. Bezel
26. Bezel surface
28. Monitor face surface

DETAILED DESCRIPTION

Figure 2:
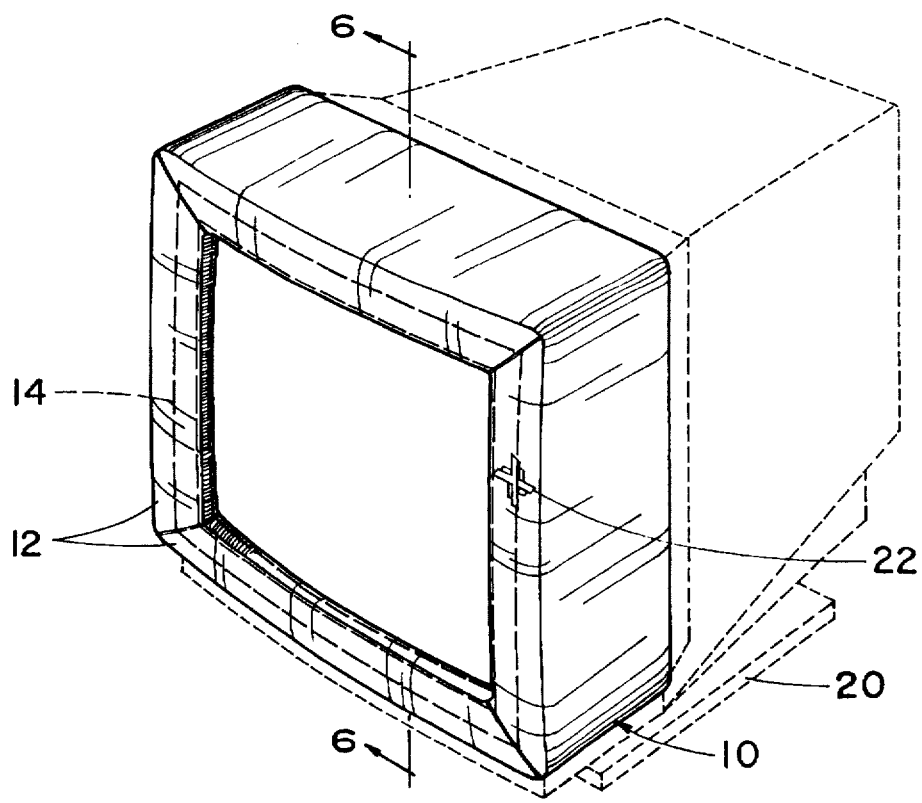
FIG. 2 shows a front perspective view of a second embodiment of the present invention shown in place on a computer monitor.

As shown in FIG. 1, the decorative cover of the present invention comprises a covering material assembly 10 configured to conform to the general size and shape of the forward top, sides, and bottom, and front of a computer monitor 20, monitor 20 being shown in broken lines for illustrative purposes only and forming no part of the present invention. FIG. 2 shows a second embodiment of the present invention where the covering material assembly 10 more fully covers the forward portion of monitor 20. Covering material assembly 10 comprises pieces of textile fabric, leather, vinyl, or other covering material 12 sewn or otherwise fastened together.

Attached to covering material assembly 10 is a preformed support member 14 configured to conform to the general size and shape of the front of monitor 20. Covering material assembly 10 and preformed support member 14 have coordinating openings configured to conform to the general size and shape of a computer monitor screen through which opening the screen is directly viewed. A decorative feature 22 is shown attached to covering material assembly 10 in FIG. 2 and is shown for illustrative purposes only in that the decorative feature 22 may be of any form or material and is not restricted to the configuration as shown.

Figure 3:
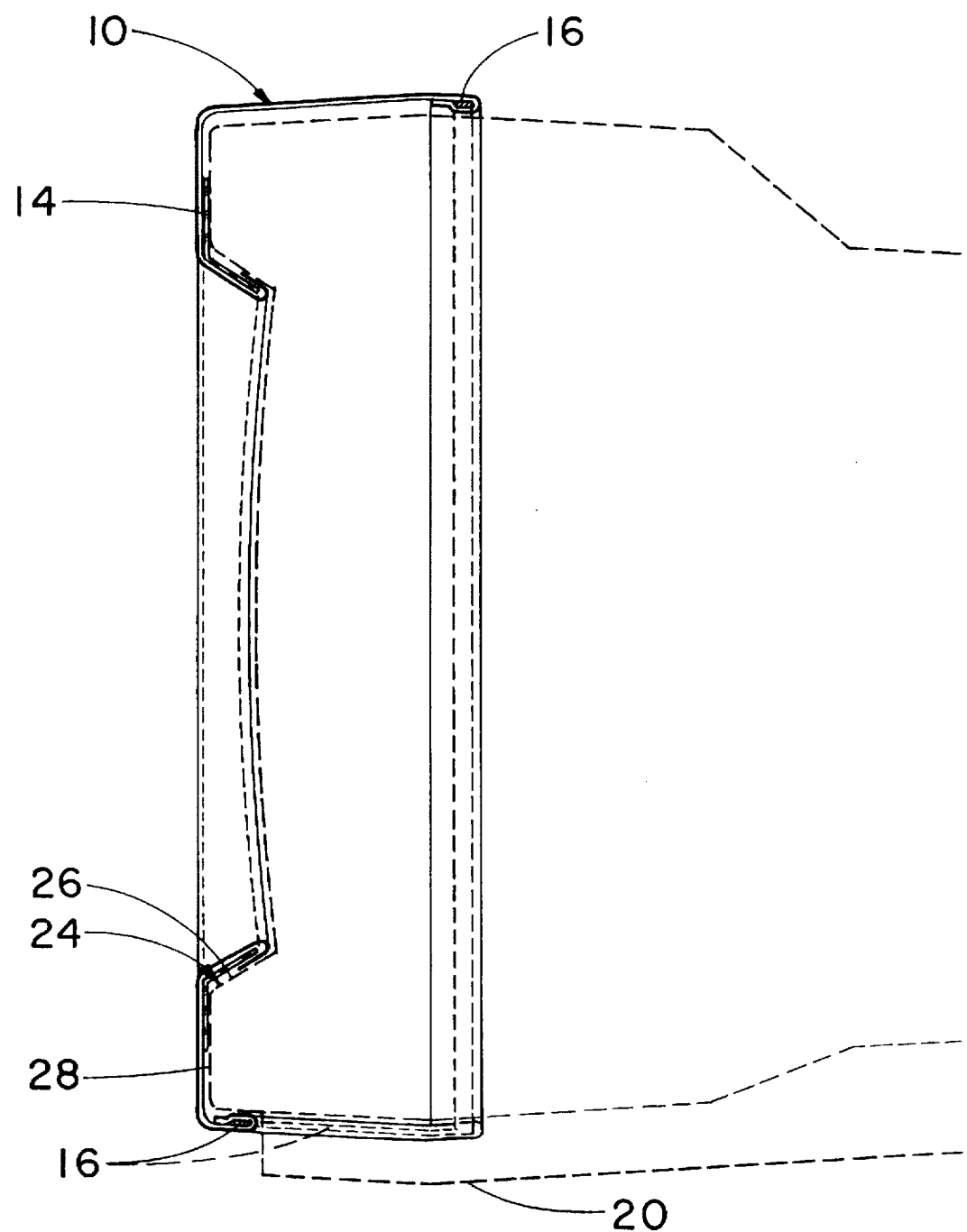
FIG. 3 shows a sectional view taken along line 3—3 of FIG. 1 showing the securing means comprised of elastic banding.
Figure 4:
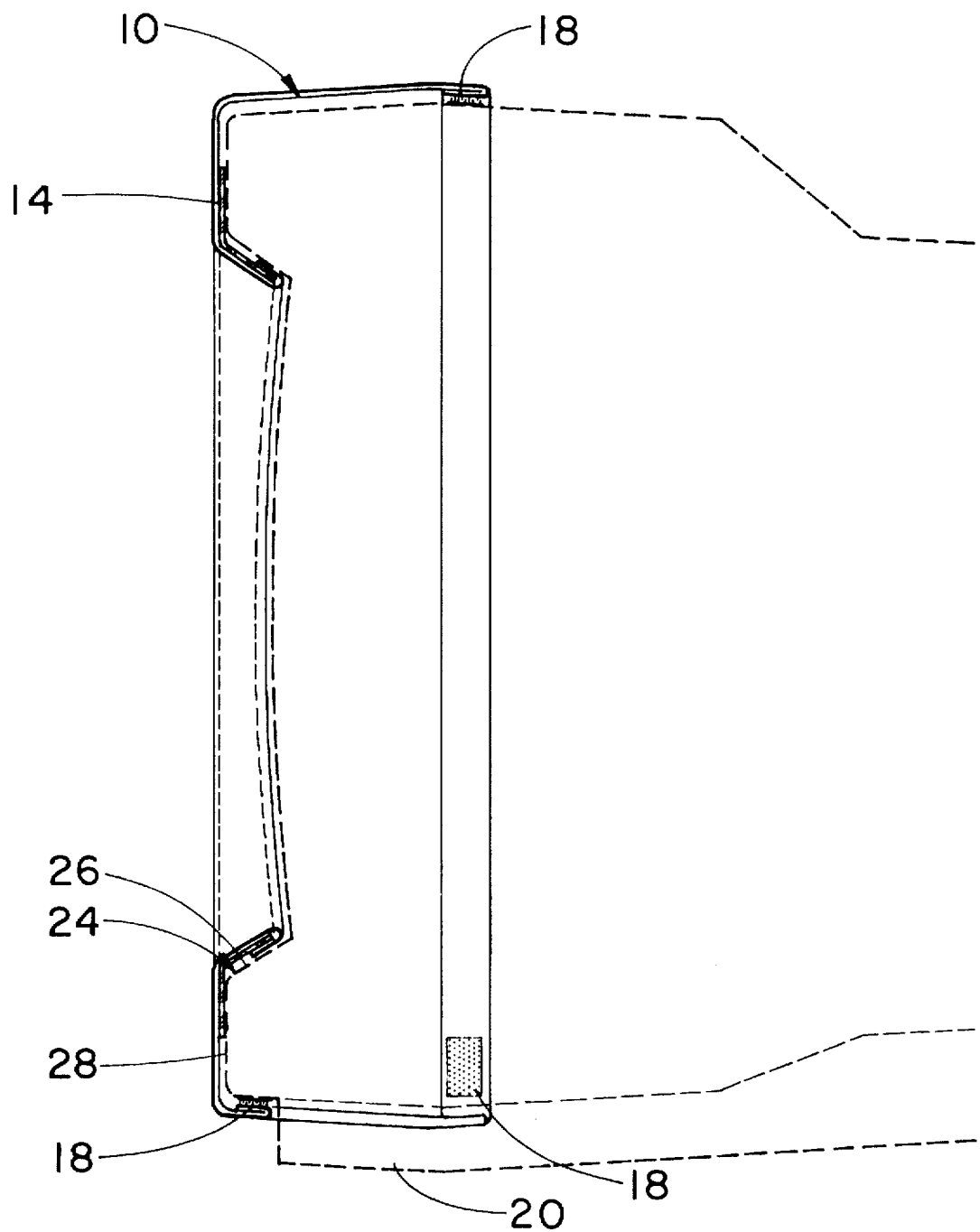
FIG. 4 shows a sectional view taken along line 3—3 of FIG. 1 showing the securing means comprised of hook and loop fastening strips.
Figure 5:
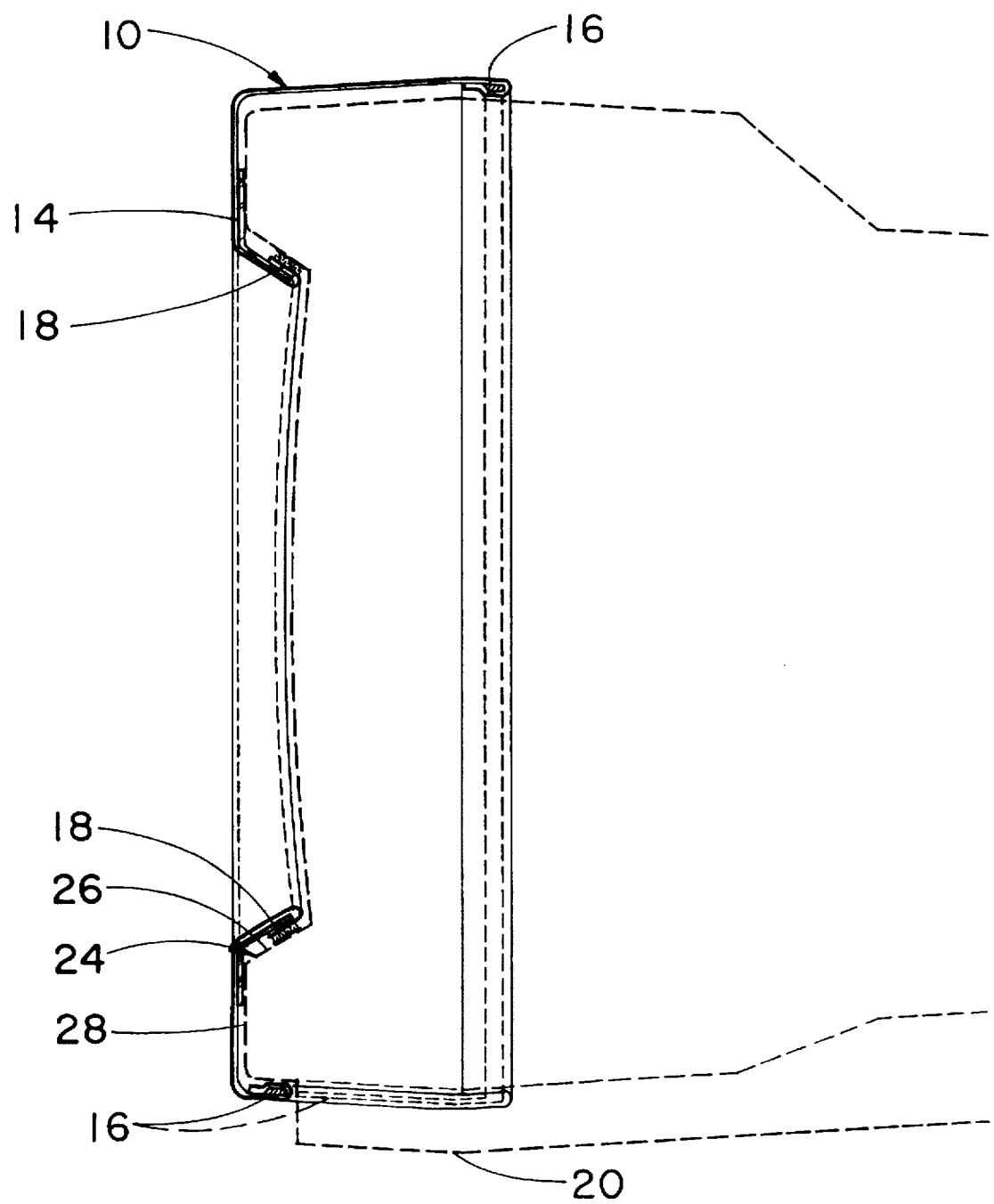
FIG. 5 shows a sectional view taken along line 3—3 of FIG. 1 showing the securing means comprised of elastic banding and hook and loop fastening strips.
Figure 6:
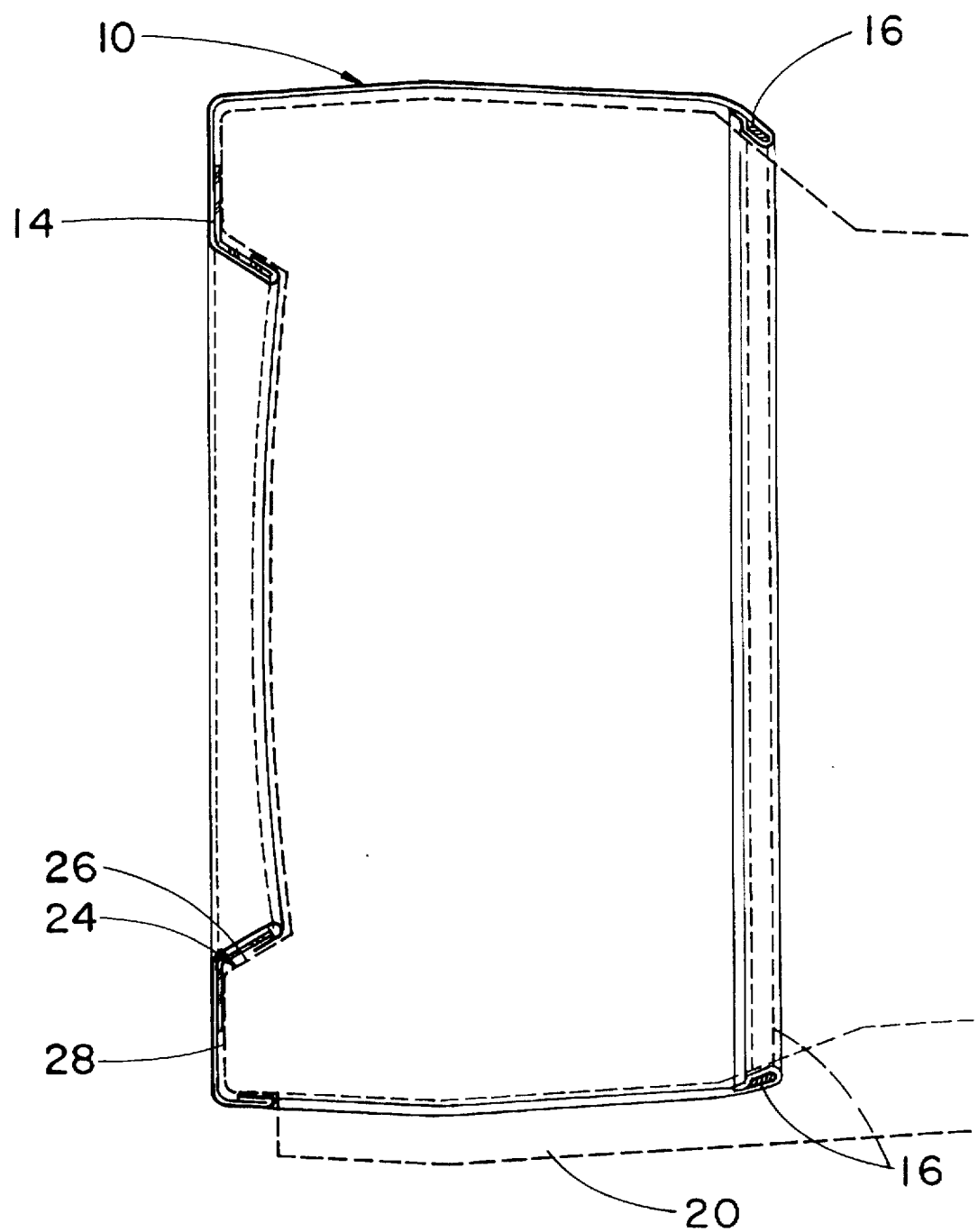
FIG. 6 shows a sectional view taken along line 6—6 of FIG. 2 showing the securing means comprised of elastic banding.
Figure 7:
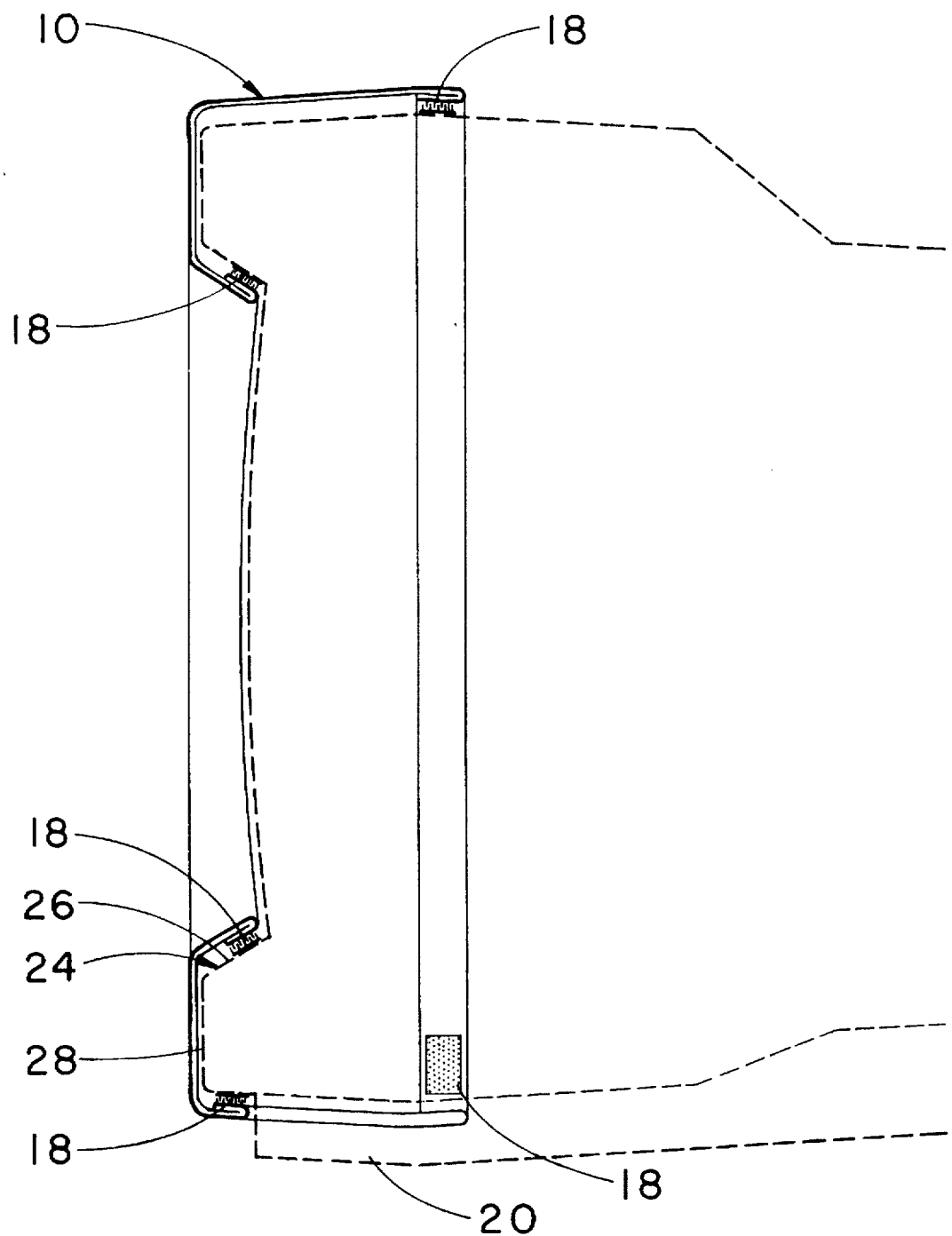
FIG. 7 shows a sectional view taken along line 3—3 of FIG. 1 showing a securing means comprised of hook and loop fastening strips used in lieu of a preformed support member to hold the decorative cover in place on a computer monitor.

Applied to covering material assembly 10 is a securing means for holding the decorative cover in place on monitor 20. For ease of reference, FIGS. 3 through 7 show certain features of the reference monitor 20 relevant to the present invention, namely, the bezel 24, the bezel surface 26, and the monitor face surface 28. FIGS. 3 and 4 show the securing means comprised of elastic banding 16 used in different embodiments of the present invention. FIG. 4 shows the securing means comprised of hook and loop fastening strips 18. FIG. 5 shows the securing means comprised of elastic banding 16 and hook and loop fastening strips 18. FIG. 7 shows yet another embodiment of the present invention in which the preformed support member 14 has been omitted and the covering material assembly 10 is held in place by securing means comprised of hook and loop fastening strips 18.

Covering material assembly 10, preformed support member 14, and the securing means are the principal components of the present invention. The specific size and shape of the decorative cover made according to the present invention will be dependent on the size and shape of the computer monitor for which it is intended to cover. Thus, it is to be understood that the embodiments of the cover shown in the accompanying drawings are for the purposes of illustration only and that the configuration of the decorative cover may vary depending on the configuration of any computer monitor without departing from the present invention.

OPERATION

The manner of using the present invention is as described in the following:

The embodiments of the decorative cover as shown in FIGS. 1 and 2 are placed on a computer monitor by first setting the preformed support member 14, having the covering material 12 attached thereon, into the front screen recess, commonly referred to as a bezel 24, of the monitor 20. Having done this the next step is to engage the securing means. The securing means, as shown in FIGS. 3 and 6, comprising elastic banding 16, is engaged by stretching the banding, being attached to the covering material, over and around the protruding corners of the monitor. The securing means as shown in FIG. 4, comprising hook and loop fastening strips 18, is engaged by locking together the hook and loop fastening strips which have been attached to the covering material and monitor. The securing means as shown in FIG. 5, comprising elastic banding and hook and loop fastening strips, is engaged as described above for each individual securing means method.

The embodiment of the decorative cover as shown in FIG. 7, in which the preformed support member has been omitted, is placed over the monitor in much the same way as described above. The covering material assembly is fitted into the front screen recess of the monitor. Then the securing means, comprising hook and loop fastening strips, is engaged by locking together the hook and loop fastening strips which have been attached to the covering material and the monitor.

APPLICATION SUMMARY AND SCOPE

Thus the reader will see that the decorative cover of the present invention provides a way to personalize and decorate a personal computer, specifically a computer monitor, that it can be constructed of many different covering materials having various colors, textures, and patterns, and that it can have decorative feature applied to it. The reader will also see that the present invention can be conformed to the size and shape of any computer monitor, that it has securing means to hold it in place on the monitor, and that it can remain in place on the monitor while the monitor is in use. Further, the reader will see that the present invention is easily removable and that it provides a degree of protection to the monitor.

Having described the foregoing embodiments of the present invention, other and different embodiments will become apparent to those skilled in the art without departing from the scope of the present invention. It is intended that all such embodiments may fall within the scope of the appended claims.

What is claimed is:

1. A cover assembly for covering portions of a computer monitor, the computer monitor comprising a housing having lateral and top and bottom sides defining side surfaces, a front side defining a face surface, the face surface extending inwardly from and substantially perpendicular to the side surfaces, a video display screen, supported within the computer monitor housing, presenting a video display surface, and a display bezel defining a bezel surface extending from the face surface to the video display surface and angularly displaced from the video display and face surfaces, said cover assembly comprising;

a flexible cover member shaped to form a closed band, said cover member having an inside cover surface and an outside cover surface and opposed inner and outer cover edges extending along said cover member, said flexible cover member defining a viewing aperture therethrough, a semi-rigid support member disposed in engagement with said cover member adjacent said inner cover edge, said semi-rigid support member being shaped and configured so as to conform portions of said flexible cover member adjacent said inner cover edges to a shape and configuration corresponding generally to the shape and configuration of the bezel surface of the computer monitor; and securing means adapted to mount said flexible cover member in engagement about the computer monitor such that the video display surface is viewable through said viewing aperture of said flexible cover member and, wherein a portion of said flexible cover member adjacent said inner cover edge is disposed adjacent to the bezel surface and urged into overlying relation with the bezel surface by said semi-rigid support member so as to substantially cover the bezel surface, and further wherein other portions of said flexible cover member are disposed and maintained in overlying relation to at least the face surface of the computer monitor.

2. The cover assembly of claim 1 wherein portions of said cover member are maintained in overlying relation to at least one side surface of the computer monitor when said flexible cover member is mounted in engagement about the computer monitor.

3. The cover assembly of claim 1 wherein said securing means comprises hook and loop fasteners having cooperating members disposed in engagement with said semi-rigid support member and the bezel surface so as to support said portion of said flexible cover member adjacent said inner cover edge adjacent to and in overlying relation with the bezel surface.

4. The cover assembly of claim 1 wherein said securing means comprises an elastic band engagable with said flexible support member and adaptable to support said flexible cover member in adjustable and removable engagement with the computer monitor.

5. The cover assembly of claim 4 wherein said elastic band extends longitudinally along said flexible cover member adjacent said outer cover edge and is adapted to cause a portion of said flexible cover member adjacent said outer cover edge to elastically and compressively engage the side surfaces of the computer monitor when said cover assembly is mounted to the computer monitor.

6. The cover assembly of claim 1 wherein said securing means includes a hook and loop fastener having cooperating members disposed in engagement with said semi-rigid support member and the bezel surface so as to support said portion of said flexible cover member adjacent said inner cover edge adjacent to and in overlying relation with the bezel surface. and an elastic band engagable with said flexible cover member and disposable in compressive engagement with the computer monitor to support said flexible cover member in adjustable and removable engagement with the computer monitor.

7. The cover assembly of claim 6 wherein said elastic band extends longitudinally along said flexible cover member adjacent said outer cover edge and is adapted to cause a portion of said flexible cover member adjacent said outer edge to elastically and compressively engage the side surfaces of the computer monitor when the cover assembly is mounted to the computer monitor.

8. The cover assembly of claim 1 further comprising a decorative feature adapted for mounting along the outside cover surface.

9. A cover assembly for covering portions of a computer monitor. the computer monitor comprising a housing having lateral and top and bottom sides defining side surfaces, a front side defining a face surface. the face surface extending inwardly from and substantially perpendicular to the side surfaces, a video display screen supported within the computer monitor housing and presenting a video display surface, and a display bezel defining a bezel surface extending from the face surface to the video display surface and angularly displaced from the video display and face surfaces, said cover assembly comprising:

a flexible cover member shaped to form a closed band, said cover member having an inside cover surface and an outside cover surface and opposed inner and outer cover edges extending along said cover member, said cover member defining a viewing aperture therethrough, and securing means adapted to mount said flexible cover member in engagement about the computer monitor such that the video display surface is viewable through said viewing aperture of said flexible cover member ana, wherein a portion of said flexible cover member adjacent said inner cover edge is disposed adjacent to and urged into overlying relation with the bezel surface so as to substantially cover the bezel surface, and further wherein other portions of said flexible cover member are disposed and maintained in overlying relation to at least the face surface of the computer monitor.

10. The cover assembly of claim 9 further comprising a decorative feature adapted for mounting along the outside cover surface.

* * * * *